Figure 1:
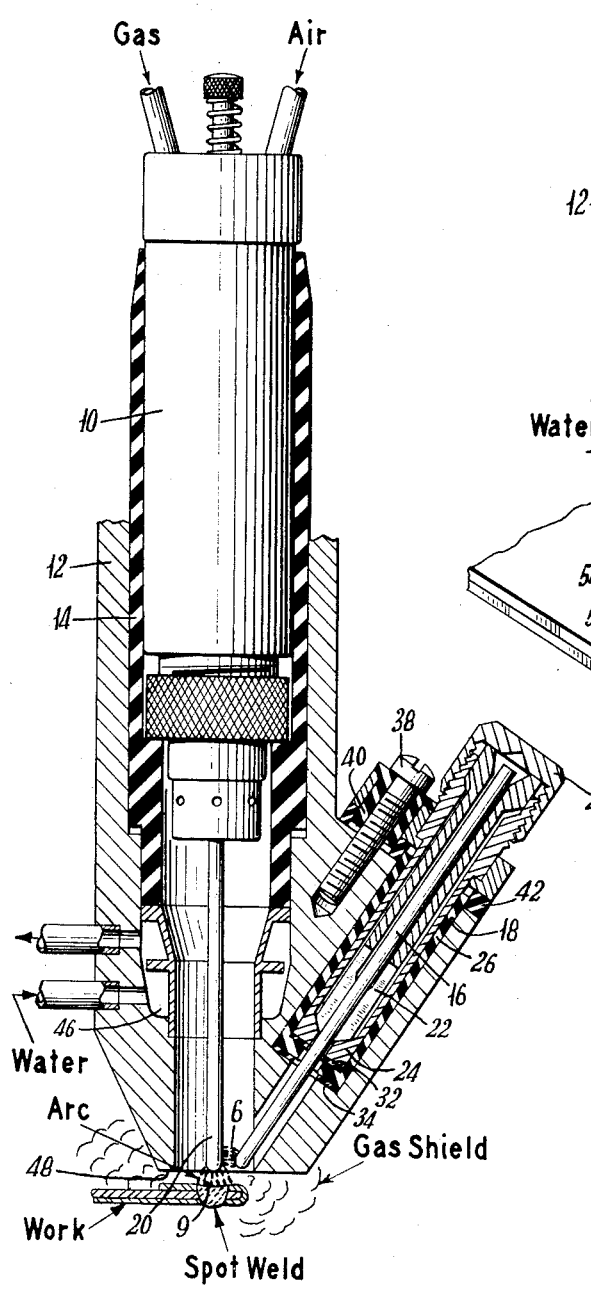

Sept. 29, 1959

C. W. HILL ET AL 2,906,854

GAS-SHIELDED ARC TORCHES

Filed April 26, 1957

INVENTORS
CLIFFORD W. HILL
JOHN S. KANE

BY *Richard S. Shreve*
ATTORNEY

United States Patent Office 2,906,854
Patented Sept. 29, 1959

2,906,854

GAS-SHIELDED ARC TORCHES

Clifford W. Hill, Mountainside, and John S. Kane, Watchung, N.J., assignors to Union Carbide Corporation, a corporation of New York Application April 26, 1957, Serial No. 655,315

2 Claims. (Cl. 219—75)

This invention relates to gas-shielded arc torches, and more particularly to multi-electrode torches.

The use of high-frequency current for initiating the arc in electric arc welding has inherent disadvantages of the creation of high-frequency radiation, and unreliability of starting.

The main objects of this invention are to avoid the disadvantages of the use of high-frequency current, and to employ a D.C. or commercial frequency A.C., pilot high-pressure arc established between the end of an insulated auxiliary electrode and the main electrode, for initiating the main arc.

According to the invention there is provided an arc torch having in addition to the primary electrode, a pilot high-pressure arc auxiliary electrode that is insulated therefrom and from the gas cup or nozzle of the torch, in which such auxiliary electrode is mounted in inclined relation to the primary electrode for adjustment longitudinally of itself to set the pilot arc gap between its end and the end of such primary electrode for the purpose of carrying a pilot arc in the gas discharge outlet of such nozzle to avoid the use of high-frequency.

The advantages derived from the use of such a pilot high-pressure arc, established between an insulated auxiliary electrode and the main electrode are that the use of the objectionable high frequency with its inherent disadvantages is avoided, reliable starting is assured, the need for a high frequency power source is eliminated, and the use of an insulated auxiliary electrode eliminates the necessity of insulating the shielding gas nozzle assembly.

Figure 2:
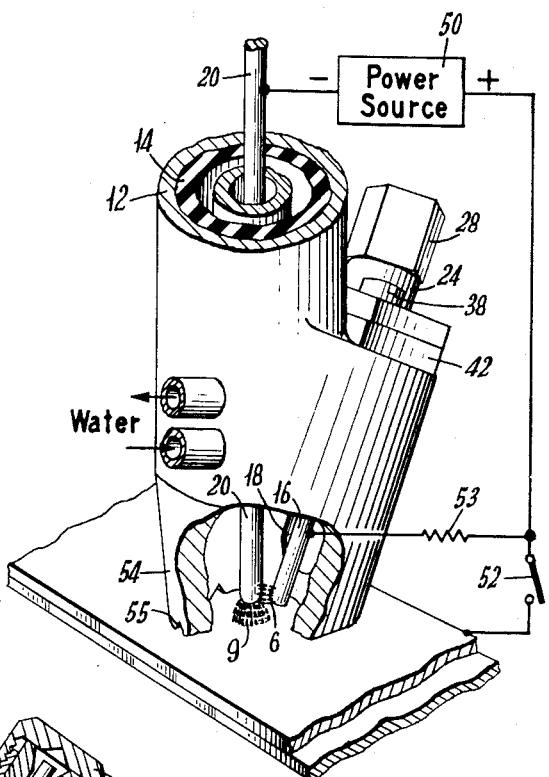

In the drawing:

Fig. 1 is a fragmentary view partly in vertical section and partly in elevation of a spot welding torch illustrating the invention; and Fig. 2 is a fragmentary perspective view of such torch plus a simplified circuit diagram.

The preferred form of the invention is shown in Fig. 1. The main electrode holder assembly 10 is identical to the torch shown in patent application Serial No. 560,117, "Gas Shielding Arc Welding Torch." This torch is mounted in a copper alloy torch holder assembly 12 which is insulated from the torch by means of the insulator sleeve 14. The front end of the torch holder assembly 12 houses an insulated auxiliary electrode 16 and forms the shielding gas nozzle of the torch.

The auxiliary electrode 16 is mounted in a cylindrical cavity 18 in the torch holder assembly 12 at an acute angle to the axis of the main electrode 20. The auxiliary electrode 16 is held in place by a collet 22 and a tubular collet body 24 which are insulated from the torch holder assembly by an insulator tube 26. A cap nut 28 screwed onto the collet body 24 supplies the force required to move the gripping fingers of the collet 22 into a tapered seat in the collet body 24 and so grip the electrode 16.

Two gaskets 32 and 34 prevent leakage of the shielding gas through the auxiliary electrode holder assembly. Two screws 38 which are insulated by bushings 40 and the insulator sheet 42 serve to retain the auxiliary electrode holder assembly in the torch holder assembly 12 and supply the necessary compression of the sealing gaskets.

In order to insure positive starting, the distance between the ends of the auxiliary electrode 16 and the main electrode 20 should be of the order of ⅛ inch or less. Loosening the cap nut 28 permits easy manual adjustment of such distance. Also, the auxiliary electrode 16 can readily be replaced by removing the cap nut 28.

The longitudinal axis of the auxiliary electrode 16, as shown, is located at an included angle of about 35° from the axis of the main electrode 20. Such 35° angle was determined as the best compromise due to a number of factors. One important factor is that atmospheric contamination of the auxiliary electrode is greatly increased if such electrode is positioned at, say, 90° to the main electrode, but atmospheric contamination is lessened or eliminated as the angle between the two electrodes approaches zero. Secondly, it would be impractical to position the auxiliary electrode at an angle of under about 20° or 30° with respect to the main electrode since that would necessitate moving the cooling water chamber 46 further away from the end of the nozzle 48. Also, since it is desirable to locate the pilot arc as near the tip of the main electrode as possible, an angle between the auxiliary electrode and the main electrode of less than roughly 10° offers the possibility of premature arcing (pilot arcing removed from the tip of the main electrode). Additionally, the greater the angle between the axis of the auxiliary electrode and the axis of the main electrode, the closer the auxiliary electrode insulator body 20 is to the heat zone with the resulting possibility of overheating of this part.

Direct water cooling of the shielding gas nozzle or cup is provided by the water chamber located between the brass water baffle and the torch holder.

In spot-welding the torch is operated from a direct current, straight polarity power source 50, as shown in Fig. 2. The main electrode 20 is connected by a lead to the negative terminal of the D.C. source 50, the positive terminal of which is connected to the workpiece by a lead and a normally open contactor 52. The auxiliary electrode is connected to the lead from the positive terminal by a conductor containing a suitable resistance 53. A combination of A.C. and D.C. power may also be used.

A variation of the torch is shown in perspective in Fig. 2, the only difference between this torch and the torch of Fig. 1 is the fact that the cup 54 is pressed directly against the workpiece in the spot-welding operation. For this application, gas ports 55 are machined into the end face of the nozzle to permit the escape of the shielding gas. This drawing illustrates the paths, applicable to both torch variations, of: the pilot arc 6 established between the auxiliary electrode 16 and the main electrode 20; and the main arc 9 established from the main electrode 20 to the workpiece.

What is claimed is:

1. In an arc torch the combination with a body provided with means for supporting a main electrode with a portion thereof projecting axially from such means, of a combined gas cup and pilot arc electrode holder having an elongated passage in which said body is mounted with said main electrode extending axially through the remainder of such passage to the outlet end thereof, means electrically insulating said body from said holder, said body having means cooperating with said passage to form a water jacket, means including gas ports in said body for supplying gas to said passage which is discharged from the outlet end thereof, said combined gas cup and pilot arc electrode holder having an inclined socket alined with a pilot arc electrode holder therein at an angle of more than about 20° with respect to the main electrode to permit said water jacket to be near the arcing tip of the main electrode, and to avoid pilot arcing removed from the main electrode, but considerably less than 90° to avoid atmospheric contamination and overheating of said pilot arc electrode, means for supporting a pilot arc electrode in such socket in electrically insulated relation with said cup with a portion of the pilot arc electrode projecting through such hole into spaced relation with the end of the main electrode in the gas outlet end of said passage, and means in said auxiliary electrode supporting means for adjusting said auxiliary electrode longitudinally of itself to set the pilot arc gap between its end and the end of such primary electrode for the purpose of carrying a pilot arc in the gas discharge outlet of such nozzle.

2. In an arc torch, a torch holder assembly fitting comprising a combined gas cup and pilot arc electrode holder, said fitting having an axial bore with an upper portion for receiving a torch provided with a main electrode, arc intermediate portion forming the outer wall of a water jacket, and a lower portion forming a gas cup, said fitting also having a second bore extending from above and outside of said water jacket and inclined downwardly and inwardly and intersecting and opening into said gas cup portion and forming a socket for said pilot arc electrode, a collet body mounted in said socket and having a conical seat at the bottom of said inclined second bore, a collet in said body and extending thereabove, and a cap screw threaded on said collet body for urging said collet into gripping engagement with said auxiliary electrode and releasable for longitudinal adjustment of said auxiliary electrode longitudinally of itself to set the pilot arc gap between its end and the end of such main electrode for the purpose of carrying a pilot arc in the gas passage outlet of such nozzle.

References Cited in the file of this patent

UNITED STATES PATENTS

| | | |
|---|---|---|
| 2,358,158 | Gibbert | Sept. 12, 1944 |
| 2,798,937 | Miller | July 9, 1957 |
| 2,868,954 | Skinner et al. | Jan. 13, 1959 |

FOREIGN PATENTS

| | | |
|---|---|---|
| 1,105,309 | France | June 29, 1955 |